No. 810,371. PATENTED JAN. 16, 1906.
W. R. GREEN.
ABSORBENT BANDAGE.
APPLICATION FILED DEC. 23, 1905.
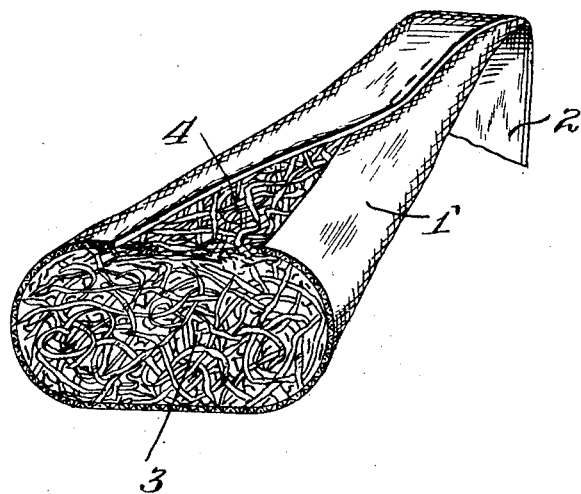
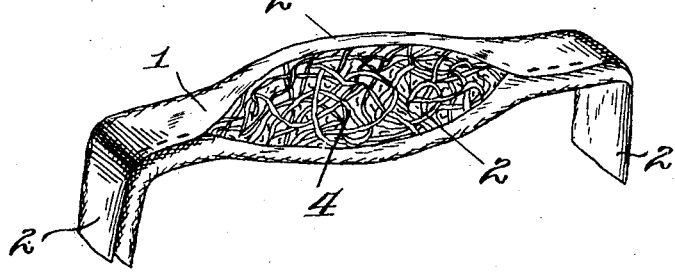

UNITED STATES PATENT OFFICE.

WILLARD R. GREEN, OF MUSCATINE, IOWA.

ABSORBENT BANDAGE.

No. 810,371.  Specification of Letters Patent.  Patented Jan. 16, 1906.

Application filed December 23, 1905. Serial No. 293,123.

*To all whom it may concern:*

Be it known that I, WILLARD R. GREEN, a citizen of the United States, residing in Muscatine, in the county of Muscatine and State of Iowa, have invented certain new and useful Improvements in Absorbent Bandages, of which the following is a specification.

This invention relates to absorbent bandages, and has for an object to provide improved absorbent bandages for surgical and other purposes, the filling of which is wholly or partly made up of grass of ribbon-like form.

In absorbent bandages which are designed for taking up fluids, some of which are relatively thin and capable of ready absorption and some of which are thicker and are not so readily absorbable, and which fluids have certain portions which are of a readily coagulative nature, it is necessary that the various portions of the absorptive mass shall be so disposed that the more fluid portions will be readily absorbed and that the portions which enter more slowly into the various interstices and cell-spaces of the mass shall be so taken care of that they may readily find proper lodgment within the body of the mass, and such member must also be so organized that it will receive and retain the coagulative and comparatively unabsorbable portions of the material for absorption. It is also desirable that the absorbent shall be capable of receiving a relatively large quantity of fluid quickly delivered to it and retain the same until it has been properly distributed throughout the various portions of the entire mass.

It has been found that certain natural grasses of ribbon-like form when properly treated are in a curly condition, and a mass of this curly grass will, either alone or combined with other material, such as filaments or fiber—such, for instance, as vegetable or wood fiber—afford an efficient absorptive mass for this purpose.

In the drawings accompanying and forming a part of this specification, an embodiment of a form of the invention is illustrated, wherein Figure 1 is a perspective view of a bandage, and Fig. 2 is a perspective and cross-section in line 2 2 of Fig. 1, only one-half of the bandage being shown.

The bandage illustrated herein is shown as comprising a supporting member in the nature of a cover-sheet 1, which may be of some suitable material adapted for the purpose to which the bandage is intended to be placed. This is shown as folded up at the ends, making attaching bands or members 2, and within this support or cover-sheet is located a mass 3 of absorbent material, the cover-sheet being open and leaving a receiving or surface face 4 for the reception of the fluids and material for absorption into the absorptive mass. Such absorptive mass in the present instance is made up of ribbon-like strands commingled, leaving interstices and cell-spaces throughout the mass for the reception of the various materials delivered to it, some of which materials are more fluid than others and some of which may be coagulative and comparatively incapable of being absorbed. The material employed for the absorptive mass is partly or wholly made up of grass of strand or ribbon like form, and these curled to prevent matting and commingled and in some forms suitably compressed, so that there will be throughout the mass various interstices, and some of which, through the close proximity of one ribbon-like member to another, will be in the nature of cells or chambers. Certain grasses when properly dried by the action of heat will become curly and of a soft and pliable nature, readily adaptable for the purposes of this absorbent. These grasses when gathered at the proper period in their growth or season of the year before maturity and subjected to proper treatment—as, for instance, quick dry heat—become quite curly, and are soft, pliable, and of an absorbent nature, and may after such treatment or drying process be pressed together into a mass for absorbent purposes. These curly grass ribbons are usually of such form that the desired capillary and chamber spaces are obtained throughout the entire mass when they are promiscuously arranged.

I am aware that in English Patent No. 2,101 of 1895, granted to Richard Ecroyd for absorbent towels or pads, the expression "china-grass" is used as a material adapted as a filling for the bandage. This material, aside from the fact that it is almost as costly as silk, and therefore commercially is impracticable for use in bandages of this kind, is not, however, a grass, the term "china-grass" being a misnomer, china-grass, or more properly ramie, being a plant having leaves and a coarse stem.

I claim as my invention—

1. An absorbent material for surgical purposes, comprising a mass of grass of strand or ribbon like form treated to render the same curly, and mingled together, and a supporting member therefor.

2. An absorbent material for surgical purposes, comprising a mass of heat-treated curly grass intermingled with fiber, such for instance as a wood or vegetable fiber, and supporting means therefor.

WILLARD R. GREEN.

Witnesses:
C. H. WEED,
F. E. BOYCE.